US008489385B2

(12) United States Patent
Etzioni et al.

(10) Patent No.: US 8,489,385 B2
(45) Date of Patent: Jul. 16, 2013

(54) USE OF LEXICAL TRANSLATIONS FOR FACILITATING SEARCHES

(75) Inventors: Oren Etzioni, Seattle, WA (US); Kobi Reiter, Seattle, WA (US); Marcus Sammer, Seattle, WA (US); Michael Schmitz, Seattle, WA (US); Stephen Soderland, Bainbridge Island, WA (US)

(73) Assignee: University of Washington, Seattle, WA (US)

( * ) Notice: Subject to any disclaimer, the term of this patent is extended or adjusted under 35 U.S.C. 154(b) by 0 days.

(21) Appl. No.: 13/532,742

(22) Filed: Jun. 25, 2012

(65) Prior Publication Data
US 2012/0271622 A1      Oct. 25, 2012

Related U.S. Application Data

(62) Division of application No. 11/944,100, filed on Nov. 21, 2007, now Pat. No. 8,209,164.

(51) Int. Cl.
*G06F 17/27*   (2006.01)
*G06F 17/28*   (2006.01)

(52) U.S. Cl.
USPC .................................................. 704/2; 704/9

(58) Field of Classification Search
USPC .......................................................... 704/2, 9
See application file for complete search history.

(56) References Cited

U.S. PATENT DOCUMENTS

| 4,635,199 A | * | 1/1987 | Muraki ............................. 704/2 |
| 4,860,206 A |   | 8/1989 | Kugimiya |
| 4,864,503 A |   | 9/1989 | Tolin |
| 5,267,156 A | * | 11/1993 | Nomiyama ..................... 704/10 |
| 5,285,386 A | * | 2/1994 | Kuo .................................. 704/2 |
| 5,408,410 A |   | 4/1995 | Kaji |
| 5,426,583 A | * | 6/1995 | Uribe-Echebarria Diaz De Mendibil ......................... 704/2 |
| 5,477,451 A | * | 12/1995 | Brown et al. ..................... 704/9 |
| 5,510,981 A | * | 4/1996 | Berger et al. ..................... 704/2 |
| 5,541,836 A | * | 7/1996 | Church et al. .................... 704/7 |
| 5,541,837 A |   | 7/1996 | Fushimoto |
| 5,612,872 A | * | 3/1997 | Fujita ............................... 704/2 |
| 5,678,051 A | * | 10/1997 | Aoyama .......................... 704/2 |
| 5,721,939 A | * | 2/1998 | Kaplan ............................ 704/9 |
| 5,742,505 A |   | 4/1998 | Fushimoto |

(Continued)

OTHER PUBLICATIONS

Srinivas Bangalore, Giuseppe Riccardi "A Finite-State Approach to Machine Translation", 2001.*

(Continued)

*Primary Examiner* — Eric Yen
(74) *Attorney, Agent, or Firm* — Christensen O'Connor Johnson Kindness PLLC

(57) ABSTRACT

A translation graph is created using a plurality of reference sources that include translations between a plurality of different languages. Each entry in a source is used to create a wordsense entry, and each new word in a source is used to create a wordnode entry. A pair of wordnode and wordsense entries corresponds to a translation. In addition, a probability is determined for each wordsense entry and is decreased for each translation entry that includes more than a predefined number of translations into the same language. Bilingual translation entries are removed if subsumed by a multilingual translation entry. Triangulation is employed to identify pairs of common wordsense translations between a first, second, and third language. Translations not found in reference sources can also be inferred from the data comprising the translation graph. The translation graph can then be used for searches of a data collection in different languages.

15 Claims, 8 Drawing Sheets

U.S. PATENT DOCUMENTS

| | | | |
|---|---|---|---|
| 5,751,957 | A | 5/1998 | Hiroya |
| 5,805,832 | A * | 9/1998 | Brown et al. ..................... 711/1 |
| 5,960,382 | A * | 9/1999 | Steiner ............................. 704/2 |
| 6,006,221 | A | 12/1999 | Liddy |
| 6,092,034 | A * | 7/2000 | McCarley et al. ................ 704/2 |
| 6,182,026 | B1 * | 1/2001 | Tillmann et al. .................. 704/2 |
| 6,233,544 | B1 * | 5/2001 | Alshawi ............................ 704/2 |
| 6,356,865 | B1 * | 3/2002 | Franz et al. ....................... 704/2 |
| 6,393,389 | B1 * | 5/2002 | Chanod et al. .................... 704/7 |
| 6,405,162 | B1 * | 6/2002 | Segond et al. .................... 704/9 |
| 6,463,404 | B1 * | 10/2002 | Appleby ........................... 704/9 |
| 6,675,143 | B1 | 1/2004 | Barnes |
| 6,678,409 | B1 * | 1/2004 | Wu et al. ....................... 382/177 |
| 6,789,057 | B1 | 9/2004 | Morimoto |
| 6,816,468 | B1 | 11/2004 | Cruickshank |
| 6,820,055 | B2 | 11/2004 | Saindon |
| 7,050,964 | B2 * | 5/2006 | Menzes et al. .................... 704/2 |
| 7,107,204 | B1 * | 9/2006 | Liu et al. ........................... 704/2 |
| 7,113,903 | B1 * | 9/2006 | Riccardi et al. ................... 704/4 |
| 7,149,688 | B2 * | 12/2006 | Schalkwyk ................... 704/255 |
| 7,177,792 | B2 * | 2/2007 | Knight et al. ..................... 704/2 |
| 7,200,550 | B2 * | 4/2007 | Menezes et al. ................ 704/10 |
| 7,243,305 | B2 * | 7/2007 | Schabes et al. ............... 715/257 |
| 7,318,022 | B2 * | 1/2008 | Li .................................... 704/10 |
| 7,477,623 | B2 * | 1/2009 | Chang ........................... 370/329 |
| 7,478,033 | B2 * | 1/2009 | Wu et al. ........................... 704/2 |
| 7,493,250 | B2 * | 2/2009 | Hecht et al. ....................... 704/3 |
| 7,536,295 | B2 * | 5/2009 | Cancedda et al. ................ 704/4 |
| 7,539,619 | B1 * | 5/2009 | Seligman et al. ............ 704/277 |
| 7,577,562 | B2 * | 8/2009 | Menezes et al. .................. 704/7 |
| 7,593,843 | B2 * | 9/2009 | Aue et al. .......................... 704/2 |
| 7,620,538 | B2 * | 11/2009 | Marcu et al. ...................... 704/2 |
| 7,716,037 | B2 * | 5/2010 | Precoda et al. ................... 704/2 |
| 7,765,098 | B2 * | 7/2010 | Bradford ........................... 704/9 |
| 7,783,473 | B2 * | 8/2010 | Bangalore et al. ............... 704/2 |
| 7,827,026 | B2 * | 11/2010 | Brun et al. ........................ 704/2 |
| 7,827,028 | B2 * | 11/2010 | Miller ............................... 704/2 |
| 7,957,953 | B2 * | 6/2011 | Moore .............................. 704/2 |
| 8,024,337 | B1 * | 9/2011 | Baluja et al. ................. 707/736 |
| 8,055,495 | B2 * | 11/2011 | Sumita ............................. 704/2 |
| 8,060,358 | B2 * | 11/2011 | He et al. ............................ 704/2 |
| 8,060,360 | B2 * | 11/2011 | He .................................... 704/9 |
| 8,214,196 | B2 * | 7/2012 | Yamada et al. ................... 704/2 |
| 8,229,729 | B2 * | 7/2012 | Sarikaya et al. .................. 704/4 |
| 8,265,923 | B2 * | 9/2012 | Chatterjee et al. ............... 704/2 |
| 8,280,718 | B2 * | 10/2012 | Faddoul et al. ................... 704/6 |
| 8,285,536 | B1 * | 10/2012 | Kumar et al. ..................... 704/2 |
| 8,306,807 | B2 * | 11/2012 | Van Guilder et al. ............ 704/4 |
| 2002/0111789 | A1 * | 8/2002 | Hull .................................. 704/4 |
| 2002/0188438 | A1 * | 12/2002 | Knight et al. ..................... 704/2 |
| 2003/0014254 | A1 | 1/2003 | Zhang |
| 2003/0110023 | A1 * | 6/2003 | Bangalore et al. ............... 704/5 |
| 2003/0176995 | A1 | 9/2003 | Sukehiro |
| 2004/0122656 | A1 | 6/2004 | Abir |
| 2004/0254782 | A1 * | 12/2004 | Li .................................... 704/8 |
| 2005/0055217 | A1 * | 3/2005 | Sumita et al. ................ 704/277 |
| 2005/0261910 | A1 * | 11/2005 | Precoda et al. .............. 704/277 |
| 2006/0111896 | A1 * | 5/2006 | Menezes et al. ................ 704/10 |
| 2006/0224378 | A1 * | 10/2006 | Chino et al. ...................... 704/2 |
| 2007/0106499 | A1 * | 5/2007 | Dahlgren et al. ............... 704/10 |
| 2007/0265826 | A1 * | 11/2007 | Chen et al. ........................ 704/2 |
| 2008/0172219 | A1 | 7/2008 | Thomas |
| 2008/0300857 | A1 * | 12/2008 | Barbaiani et al. ................ 704/4 |
| 2009/0024595 | A1 * | 1/2009 | Chen ................................. 707/4 |
| 2009/0132230 | A1 | 5/2009 | Kanevsky |
| 2009/0132233 | A1 * | 5/2009 | Etzioni et al. .................... 704/3 |
| 2009/0193003 | A1 * | 7/2009 | Heymans et al. ................. 707/3 |
| 2009/0248416 | A1 * | 10/2009 | Gorin et al. ................... 704/257 |
| 2010/0082324 | A1 * | 4/2010 | Itagaki et al. ..................... 704/2 |

OTHER PUBLICATIONS

Kevin Knight, Yaser Al-Onaizan, "Translation with Finite-state devices", 1998.*

J.M. Vilar, A. Castellanos, VV.M. Jimenez, J. Oncina, H. Rulot, J.A. Sanchez, E. Vidal, "Spoken-Language Machine Translation in Limited Domains: Can it be Achieved by Finite-state models?" 1995.*

Stephan Vogel, Ying Zhang, Fei Huang, Alicia Tribble, Ashish Venugopal, Bing Zhao, Alex Waibel, "The CMU Statistical Machine Translation System", 2003.*

Stephan Vogel, "Translation with Cascaded Finite State Transducers", 2000.*

Jinxi Xu, Ralph Weischedel "Cross-lingual Information Retrieval using Hidden Markov Models", 2000.*

Bowen Zhou, Stanley Chen, Yuquing Gao, "Constrained Phrase-based translation using Weighted Finite-state transducers", IEEE 2005.*

Diab, M., and P. Resnik, "An Unsupervised Method for Word Sense Tagging Using Parallel Corpora," Proceedings of the 40th Annual Meeting of the Association for Computational Linguistics (ACL '02), Philadelphia, Jul. 6-12, 2002, pp. 255-262.

Dyvik, H., "Translations as Semantic Mirrors: From Parallel Corpus to Wordnet," Proceedings from the 23rd International Conference on English Language Research on Computerized Corpora (ICAME 23), Göteborg, Sweden, May 22-26, 2002, pp. 311-326, in Aijmer, K., and B. Altenberg (eds.), "Advances in Corpus Linguistics," Rodopi B.V., Amsterdam, 2004.

Gey, F.C., et al., "New Directions in Multilingual Information Access," 2006 Workshop Report of the ACM Special Interest Group on Information Retrieval (SIGIR) Forum, Seattle, Wash., Aug. 9, 2006.

Gollins, T., and M. Sanderson, "Improving Cross Language Retrieval With Triangulated Translation," Proceedings of the 24th Annual International ACM SIGIR Conference on Research and Development in Information Retrieval, Sep. 9-12, 2001, New Orleans, pp. 90-95.

Gopestake, A., et al., "Acquisition of Lexical Translation Relations From MRDs," Machine Translation 9(3-4):183-219, Sep. 1994.

Hull, D.A., and G. Grefenstette, "Querying Across Languages: A Dictionary Based Approach to Multilingual Information Retrieval," Proceedings of the 19th Annual International ACM SIGIR Conference on Research and Development in Information Retrieval, Aug. 18-22, 1996, Zurich, pp. 49-57.

Ishida, T., "Language Grid: An Infrastructure for Intercultural Collaboration," International Symposium on Applications and the Internet (SAINT 2006), Jan. 23-27, 2006, Phoenix, 5 pages.

Kishida, K., "Technical Issues of Cross Language Information Retrieval: A Review," Information Processing and Management: An International Journal—Special Issue: Cross Language Information Retrieval 41(3):433-455, May 2005.

Neff, M.S., and M.C. McCord, "Acquiring Lexical Data From Machine Readable Dictionary Resources for Machine Translation," Proceedings of the Third International Conference on Theoretical and Methodological Issues in Machine Translation of Natural Languages (TMI-90), Austin, Texas, 1990, pp. 85-90.

Yarowsky, D., "Unsupervised Word Sense Disambiguation Rivaling Supervised Methods," Proceedings of the 33rd Annual Meeting of the Association for Computational Linguistics (ACL '95), Cambridge, Mass., Jun. 26-30, 1995, pp. 189-196.

* cited by examiner

ENTRY FOR WORD E FROM ENGLISH DICTIONARY    ENTRY FOR WORD R FROM RUSSIAN DICTIONARY

NODES(1) = {E, F, G, H, P, S}
NODES(2) = {G, H, L, P, R}
NODES(1) ∩ NODES(2) = {G, H, P}

OVERLAP(1,2) = MAX(3/5, 3/6) = 0.6

USE OF LEXICAL TRANSLATIONS FOR FACILITATING SEARCHES

BACKGROUND

Lexical translation is the task of translating individual words or phrases, either directly or as part of a knowledge-based machine translation (MT) system. In contrast with statistical MT, lexical translation does not require an aligned corpora as input. Because large aligned corpora are non-existent for many language pairs and are very expensive to generate, lexical translation is possible for a much broader set of languages than statistical MT. Generally, the information required for lexical translation is much easier to obtain than that required for aligned corpora.

While lexical translation has a long history, interest in it peaked in the 1990's. Many of these prior systems used machine-readable dictionaries (MRDs) to assist in the manual creation of lexicons, or used automated acquisition with post editing. Despite the shift in emphasis towards statistical MT, research on knowledge-based MT has continued, with its need for lexicon acquisition. The proliferation of MRDs and the rapid growth of multilingual Wiktionaries offer the opportunity to scale lexical translation to an unprecedented number of languages. Moreover, the increasing international adoption of the Web yields opportunities for new applications of lexical translation systems.

Translation lexicons are also a vital resource for cross-lingual information retrieval (CLIR), a subfield prompted in part by the TREC conferences and a series of SIGIR CLIR workshops. Much of the CLIR research has focused on a small number of language pairs building systems that must be adapted to one language pair at a time. While early CLIR systems typically relied on bilingual dictionaries, corpus-based methods or hybrid methods soon outstripped purely dictionary-based systems. Some of the methods used derive word-translations from parallel text. There are also hybrid systems that use corpus-based techniques to disambiguate translations provided by bilingual dictionaries.

The main drawback of using bilingual dictionaries, in past work, has been word-sense ambiguity. A single term in the source language is typically translated into multiple terms in the target language, mixing different wordsenses. Combining information from multiple bilingual dictionaries only exacerbates this problem: translating from language $l_1$ into $l_2$ and then translating each of the possible $l_2$ translations into a third language $l_3$, quickly leads to an explosion of translations.

On the Web, commercial search engines such as Google™, French Yahoo™, and German Yahoo™, offer query translation capability for only a handful of languages. For example, Google™ and other Internet companies have fielded word translator tools that enable a reader of a Web page to view the translation of particular words, which is helpful if the user is, for example, a Japanese speaker reading an English text who has come across an unfamiliar word. In contrast to the few languages for which translation is currently offered, it would be preferable to translate between a large number of languages, and preserve wordsenses, thereby inferring translations that are not found in any single dictionary. It would also be desirable to provide a translation platform for "plugging in" more and more dictionaries, and adding increasingly comprehensive Wiktionaries and corpus-based translations, all of which should lead directly to improved use of cross-lingual translations over time.

Lexical translation offers considerable practical utility in several different applications. While lexical translation does not solve the full machine-translation problem, it is valuable for a number of practical tasks including the translation of search queries, meta-tags, and individual words or phrases. Another prospective application for lexical translation is in searching for images or other non-text entities. Images represent an excellent example of entities that might more easily be found using lexical translations of an input word or phrase, although the same approach might be used to find other types of multimedia files, such as video files. Most search engines on the Internet retrieve images based on the words in the "vicinity" of the images, which limits the ability of a conventional search engine to retrieve more than a few of the relevant images that might otherwise be found. Although images are universally understood without regard to the language spoken/understood by the searcher, an English language search will fail to find images tagged with Chinese or other non-English language words or phrases. Similarly, a search made using Dutch language tags will fail to find images tagged in English or other languages.

To address this problem, it would be desirable to provide a cross-lingual image search capability that would enable searchers to translate and disambiguate their queries before sending them to a conventional image search engine, such as Google™. Currently, this approach would require considerable manual direct translation and entry of the resulting multilingual words or phrases in other languages that the searcher had manually determined were appropriate translations of a word or phrase of an initial language understood by the searcher.

SUMMARY

The following discusses a novel approach to lexical translation based on the use of a translation graph, which displays words (or phrases) in a plurality of different languages. A node in the translation graph represents a word or phrase in a particular language, and an edge denotes a wordsense shared between words (and or phrases) in a pair of languages. A system is provided that automatically constructs the translation graph from a collection of independently-authored, machine-readable bilingual dictionaries and multi-lingual wordsense distinguishing dictionaries (such as Wiktkonaries) as described below. FIG. 1 shows a portion of an exemplary translation graph 20 that includes words in different languages related to two different meanings or wordsenses for the English word "spring."

When all the edges along a path in the translation graph share the same wordsense, then the path denotes a correct translation between its end points. When wordsenses come from distinct dictionaries, however, there is an uncertainty about whether the senses are the same. Thus, it is appropriate to define an inference procedure that computes the probability that two edges denote the same wordsense, so that this probability, coupled with the structure of the graph, can be used to compute the probability that a path in the translation graph denotes a correct translation.

A PAN IMAGES cross-lingual image search engine has been developed that enables searchers to translate and disambiguate their queries before sending them to a conventional search engine. The PAN IMAGES search engine employs the lexical translation graph and has enabled evaluation of the quality of translations inferred from the lexical translation graph in the context of a practical application.

It is not intended that use of the lexical translation graph be limited only to searching for images, since it can be used for other types of searches. For example, other forms of multimedia, including video clips and audio files may be located using the lexical translation graph to identify the multimedia objects based on tags or keywords in different languages. The quality of the return on such searches will likely be much better than simply searching using only the keywords of one language, since the strength of a keyword in one language for returning desired multimedia objects can be greater than that of a keyword in a different language. The lexical translation graph can also be applied to searching for other types of objects. However, if searching for text objects, the problem will be that text in other languages can be returned as the results of the search, and a user may not have the knowledge or language skills to read or use those text objects in different languages.

More specifically, one aspect of this novel technology is direct to an exemplary method for creating a translation graph for a plurality of different languages, where the translation graph indicates words in the plurality of different languages that have corresponding wordsense meanings. The method includes the step of parsing a plurality of reference sources, each of which include translations from at least one language of the plurality of different languages into at least one different language of the plurality of different languages. This step thus identifies a plurality of words in the different languages that will be entered in the translation graph. The reference sources will typically be dictionaries, although it is contemplated that any type of document that provides translations between words in one language and those of one or more other languages can be used as a reference source for the purposed of this technique. Based upon the results of the step of parsing, the method creates wordsense entries in the translation graph for translations included in the plurality of reference sources. Each wordsense entry comprises a translation from a word in one language to one or more words in one or more languages and is a node in the translation graph. Also created are a wordnode entries for new words identified in the plurality of reference sources, and a translation entry for each wordsense and wordnode pair. Optionally, a probability assigned to any wordsense entry can be adjusted if that particular entry has more translations into the same language than a predefined threshold.

Finally, the method carries out the step of triangulating to infer equivalence between a plurality of wordsense entries. In this step, three words in three different languages comprise a triangle if there are three wordsense entries specifying that each word is a translation of the other of the three words. This triangular relationship is used to infer that the three wordsense entries are equivalent in the sense that they share an underlying meaning with a relatively high probability. In one exemplary embodiment of this step, a translation found in a multilingual reference sources between a first language and a second language and a corresponding translation found in two others of the plurality of reference sources between the first language and the third language, and between the second language and the third language comprises a triangular wordsense relationship. This triangular relationship is used to infer that all three translations have the same wordsense. The probability of this wordsense relationship can be subsequently applied in a traversal of the translation graph to determine a translation between languages not found in any of the plurality of reference sources.

At least one embodiment of this method can include the step of removing entries from the translation graph that are provided by bilingual dictionaries if the entries are subsumed by a corresponding entry provided by a multilingual dictionary.

Another step of the method can represent the translation graph with a database that includes several types of data. While it is recognized the data can be organized in many different ways, one exemplary embodiment includes a WordSenses table with data for each entry in one of the plurality of dictionaries, a WordNodes table that includes data for each new word parsed from the plurality of dictionaries, a Translations table that includes data for each wordnode and wordsense pair, and a SenseEquivalence table that includes each pair of wordsenses that forms part of a triangle and each pair of multilingual senses that overlaps by two or more words. Two nodes of the translation graph are connected by an edge if there exists an entry in the SenseEquivalence table for the corresponding wordsenses of the two nodes indicating a sense equivalence. The step of triangulating can comprise the step of querying this database to find triangles that are included therein.

The step of parsing can include the step of parsing extended markup language (XML) files for each dictionary that is included in the plurality of reference sources.

Another aspect of the novel technology is directed to a system for creating the translation graph. The system includes a memory for storing data and machine instructions, an interface that enable access to data included in a plurality of reference sources that translate between the different languages, a user input device enabling a user to input text and control the system, and a display for displaying text and graphics. A processor is coupled to the memory, the interface, the user input device, and the display and executes the machine instructions stored in the memory to carry out a plurality of functions that are generally consistent with the steps of the method discussed above.

Yet another aspect of this novel technology is directed to a memory medium on which are stored machine executable instructions. When these instructions are executed by a processor, they cause the processor to carry out functions that are generally consistent with the steps of the method discussed above.

Another aspect of the technology is directed to a method and a corresponding system for using a translation graph to search for any object, entity, or resource related to a word and language input by a user. It should be emphasized that although the term "word" (or its plural form, "words") is used consistently throughout the following discussion, the present novel technology is also applicable for creating a translation graph that includes translations of a phrase in one language into a corresponding phrase in a plurality of different languages. Just as noted above, the translation graph indicates words in a plurality of different languages that have wordsense meanings corresponding to that of the word (or phrase) in the language that is input by the user. The method includes the step of searching the translation graph for wordnodes that may have a wordsense corresponding to that of the word and the language input by the user. Each wordnode in a language different than that input by the user is coupled to a wordnode of the word that was input along a path in the translation graph. The path is a sequence of incident edges and nodes. For one or more of the wordnodes in a language different than that input by the user, which was returned from searching the translation graph, a probability that the wordnode has a wordsense corresponding to a wordsense of the word that was input is determined. A set of wordnodes is returned and the set is determined based on the wordnodes having a wordsense corresponding to that of the word input by the user, with a probability greater than a predetermined threshold. The wordnodes that are returned are supplied for inclusion in a query of a search engine. Using the query, the search engine is employed to search a collection of data to identify any object, entity, or resource that is included in the data and which is relevant to wordnodes that might correspond in wordsense to the wordsense of the word and the language input by the user. The search engine searches for tags assigned to any object, entity, or resource having the wordnodes included in the query.

The search engine can thus be used, for example, to search for relevant images based upon keyword tags associated with the images that are in languages, which are different than the language input by the user. Or as another example, the search engine can be used to search for and then present to the user, one or more ads associated with a keyword in at least one language, where the keyword has been identified as having a common wordsense with a word that has been input by the user. These and many other applications of this technology will become apparent based upon the discussion that follows.

This Summary has been provided to introduce a few concepts in a simplified form that are further described in detail below in the Description. However, this Summary is not intended to identify key or essential features of the claimed subject matter, nor is it intended to be used as an aid in determining the scope of the claimed subject matter.

DRAWINGS

Various aspects and attendant advantages of one or more exemplary embodiments and modifications thereto will become more readily appreciated as the same becomes better understood by reference to the following detailed description, when taken in conjunction with the accompanying drawings, wherein.

Figure 5:
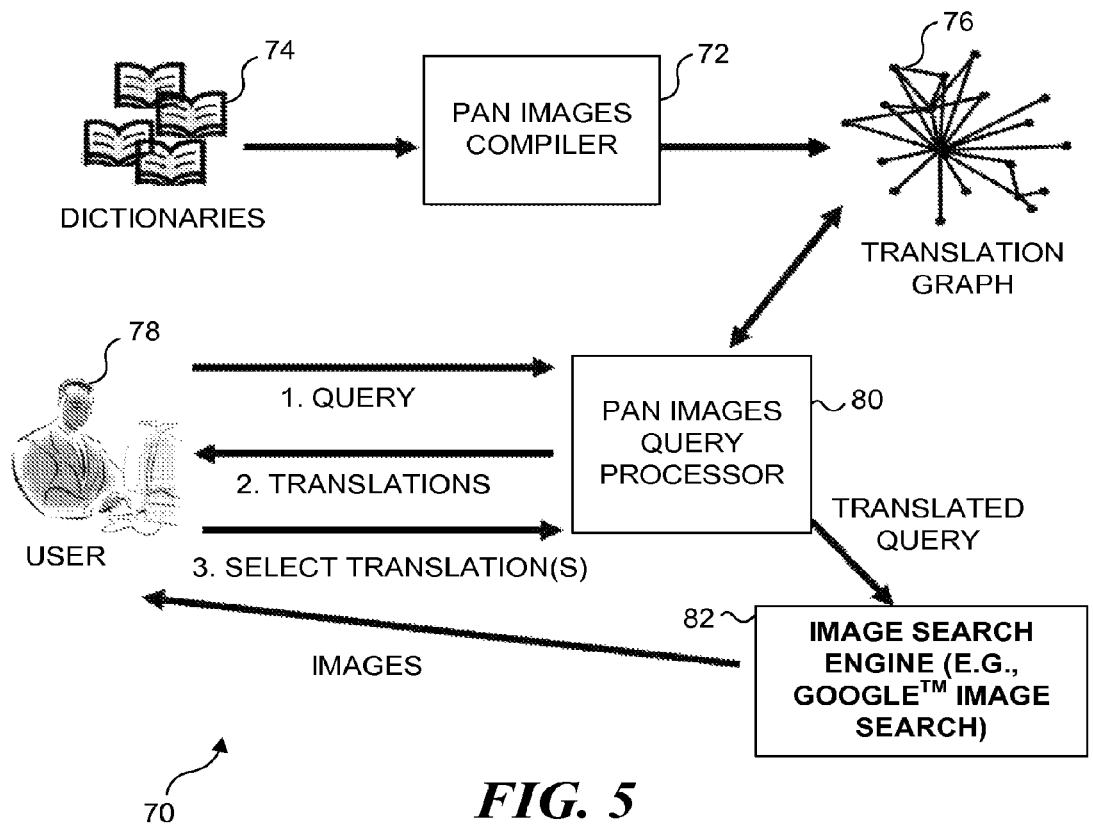
Figure 6:
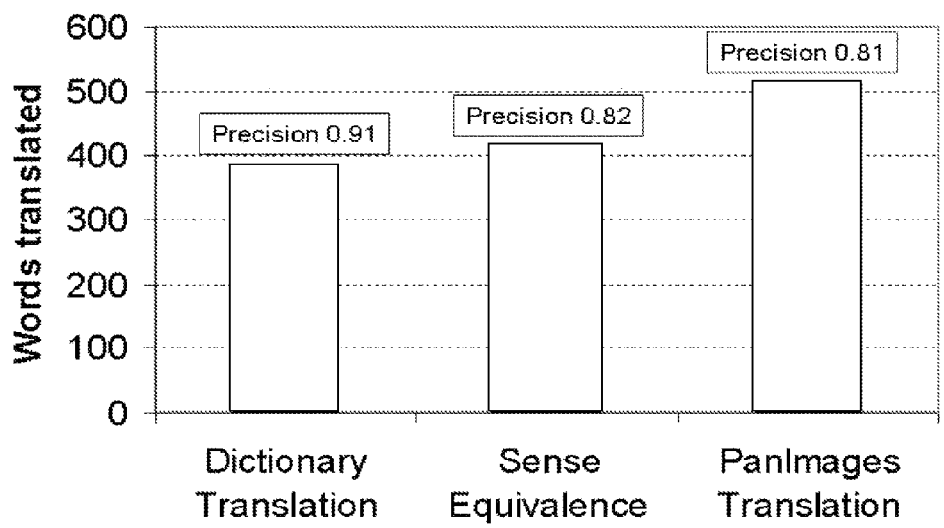
Figure 7:
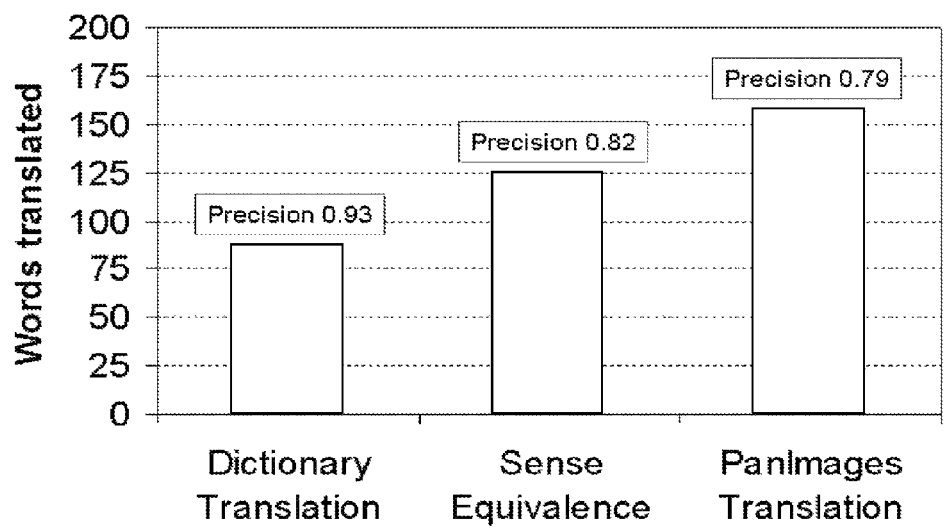
Figure 8:
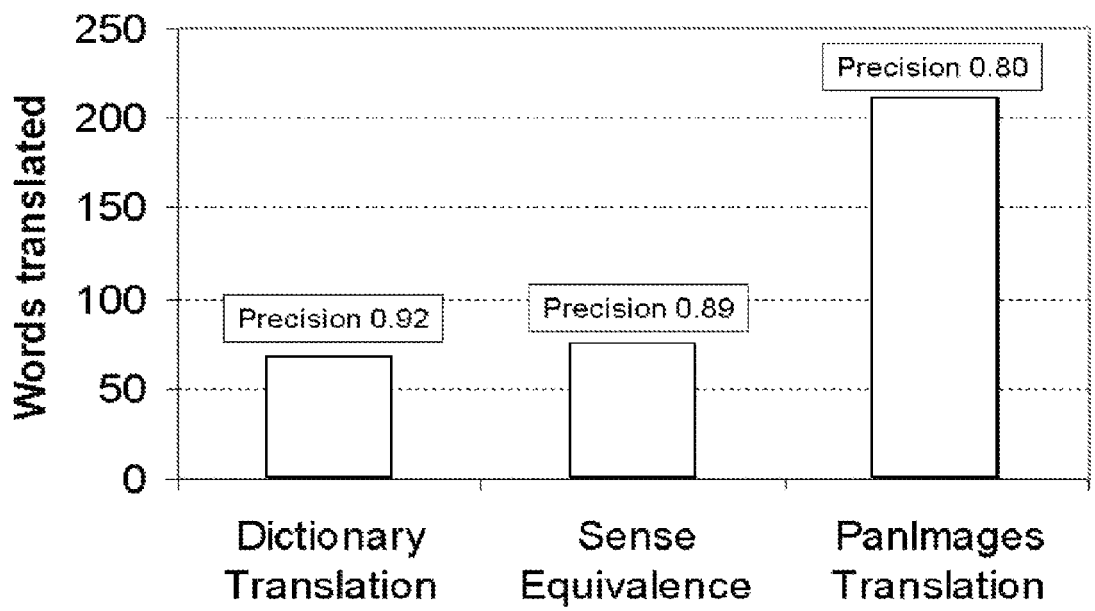
Figure 9:
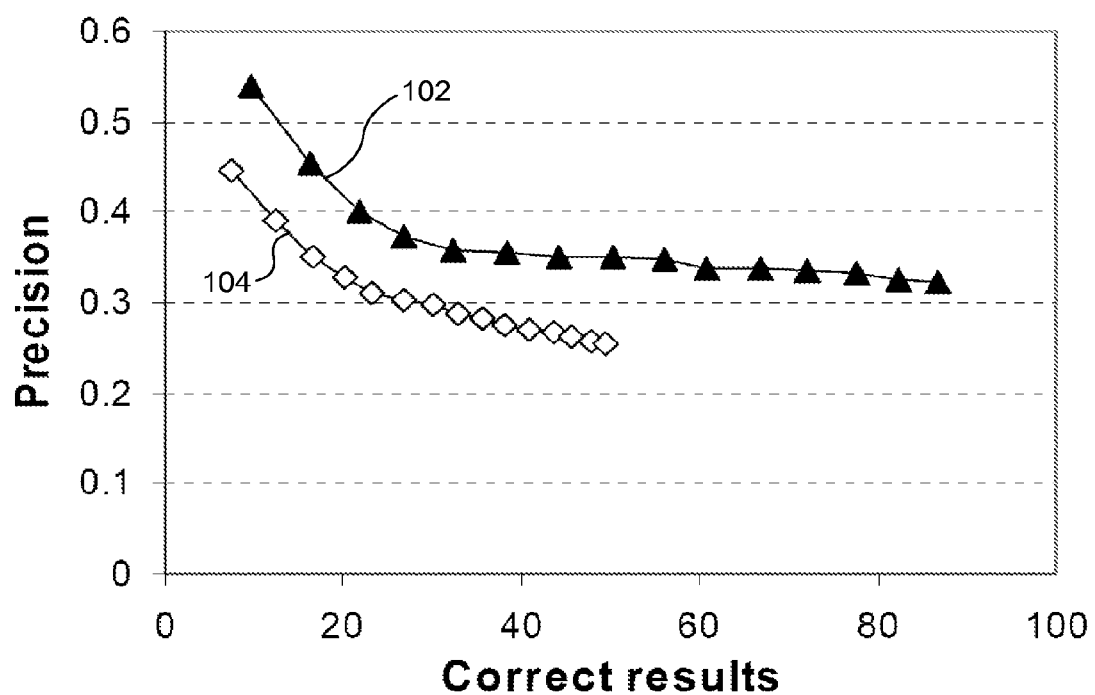
Figure 10:
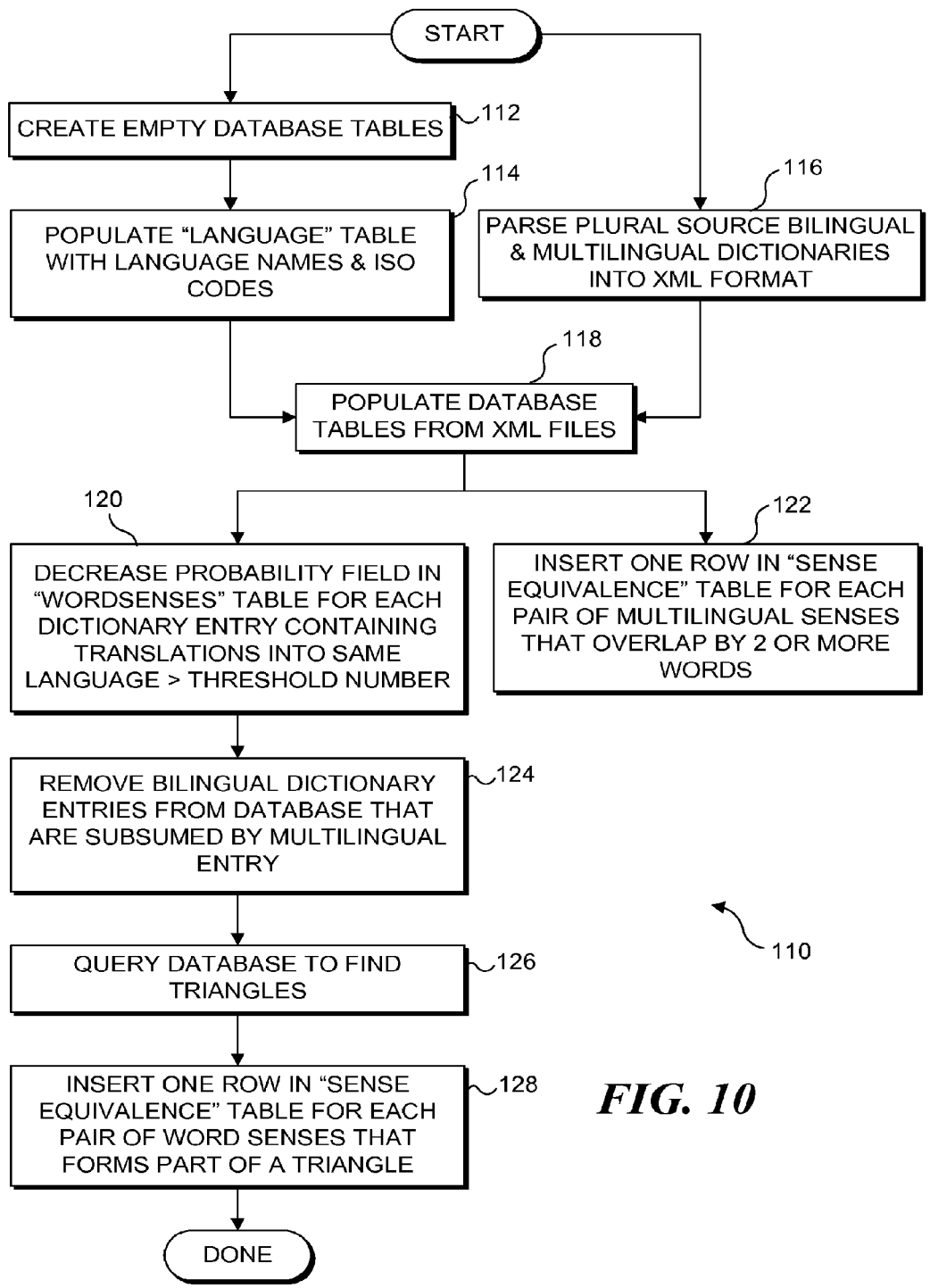
Figure 11:
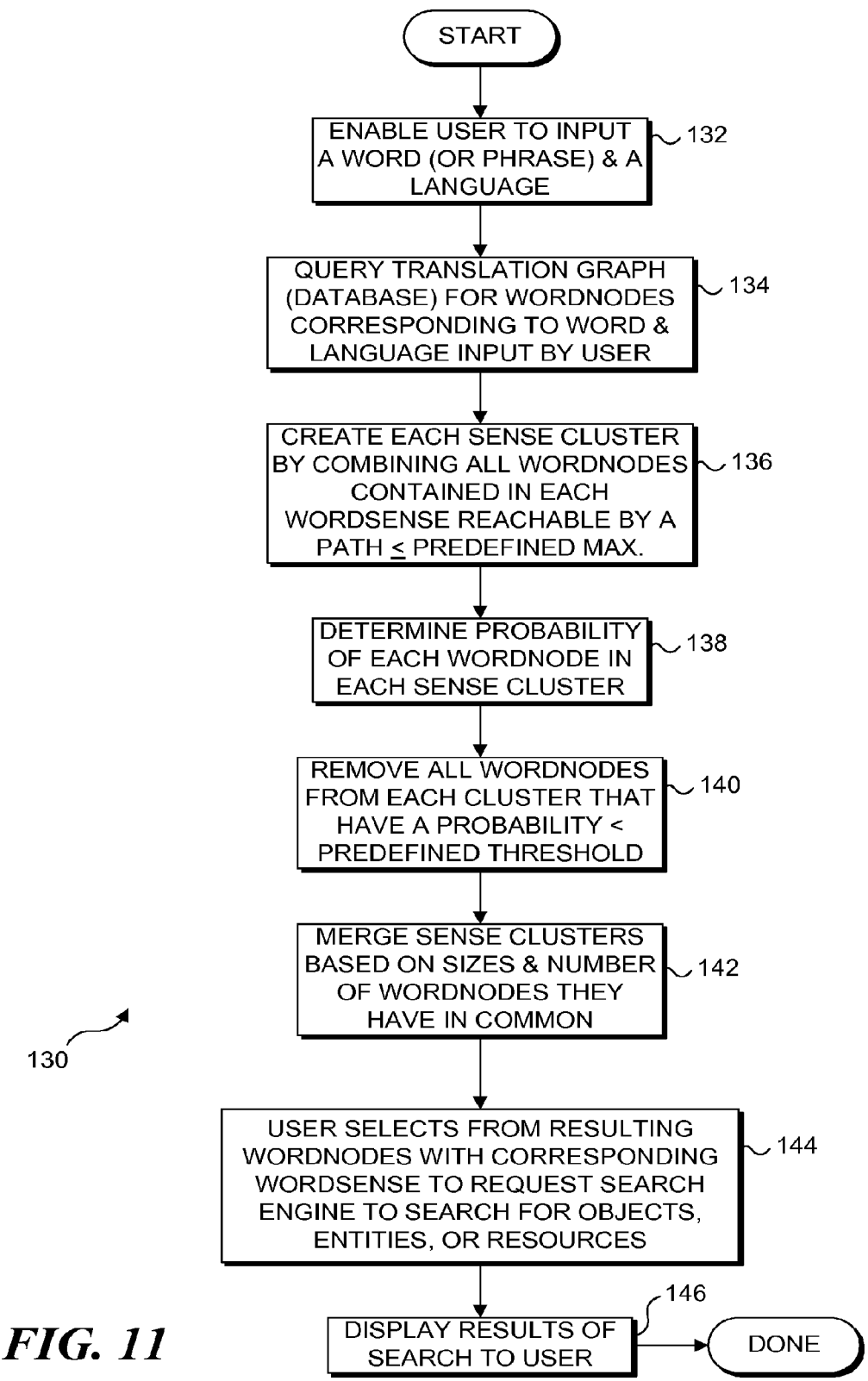
Figure 12:
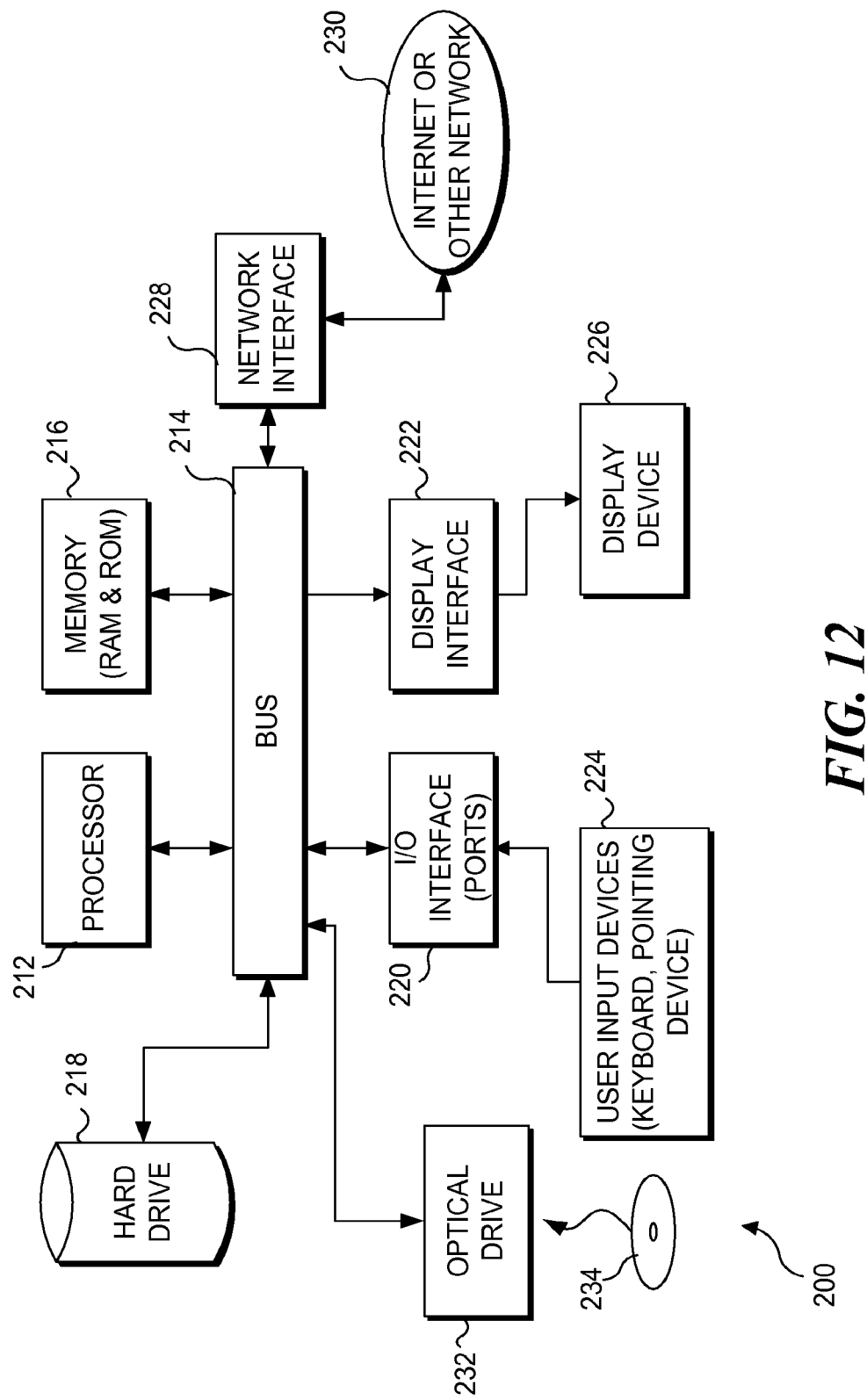

FIG. 5 is a schematic diagram illustrating how the PAN IMAGES compiler of the present novel technology creates a translation graph from multiple dictionaries, wherein the query processor takes a user query and presents a set of translations from which the user selects the desired translation(s) that are then sent by PAN IMAGES to a conventional search engine—for example to search for images having key words corresponding to those translations in different languages;

FIG. 6 is an exemplary graph comparing direct versus inferred translations from English to Russian, wherein inference from the translation graph traversal boosted the number of translated words by 33% with only a modest drop in precision;

FIG. 7 is an exemplary graph illustrating how graph traversal increased the number of translations from English to Hebrew by 80%, again with only a modest drop in precision;

FIG. 8 is an exemplary graph illustrating how translation from Turkish to Russian benefited from interaction between several bilingual dictionaries, resulting in about 3.15 times as many translated words as the base-line;

FIG. 9 is an exemplary graph comparing the results of an image search for random words in 32 languages with a limited Web presence, showing that the PAN IMAGES translation into English increased correct results by 75% from an average of 49.6 correct results on the first 270 images (the rightmost white diamond in the graph) to 86.8 for PAN IMAGES (the rightmost black triangle in the graph) and how PAN IMAGE boosts precision by approximately 27% throughout the graph;

FIG. 10 is a flowchart illustrating exemplary logical steps for creating a translation graph in accord with one embodiment of the present novel approach;

FIG. 11 is a flowchart illustrating exemplary logical steps for traversing the translation graph based upon a user input of a word in a language, to determining wordnodes for a plurality of the languages having a corresponding wordsense meaning, for use in initiating a search of a collection of data on a network; and FIG. 12 is a functional block diagram of an exemplary conventional personal computer (PC) that is usable as any of a client computer for input of a search query word in a language, to initiate traversing the translation graph and searching a collection of data, or a PC (e.g., a server) that creates the translation graph, or a PC (likely another server) that carries out the search of the collection of data on the network—such as the Internet.

DESCRIPTION

Figures and Disclosed Embodiments are not Limiting

Exemplary embodiments are illustrated in referenced Figures of the drawings. It is intended that the embodiments and Figures disclosed herein are to be considered illustrative rather than restrictive. No limitation on the scope of the technology and of the claims that follow is to be imputed to the examples shown in the drawings and discussed herein.

The Lexical Translation Graph

Figure 1:
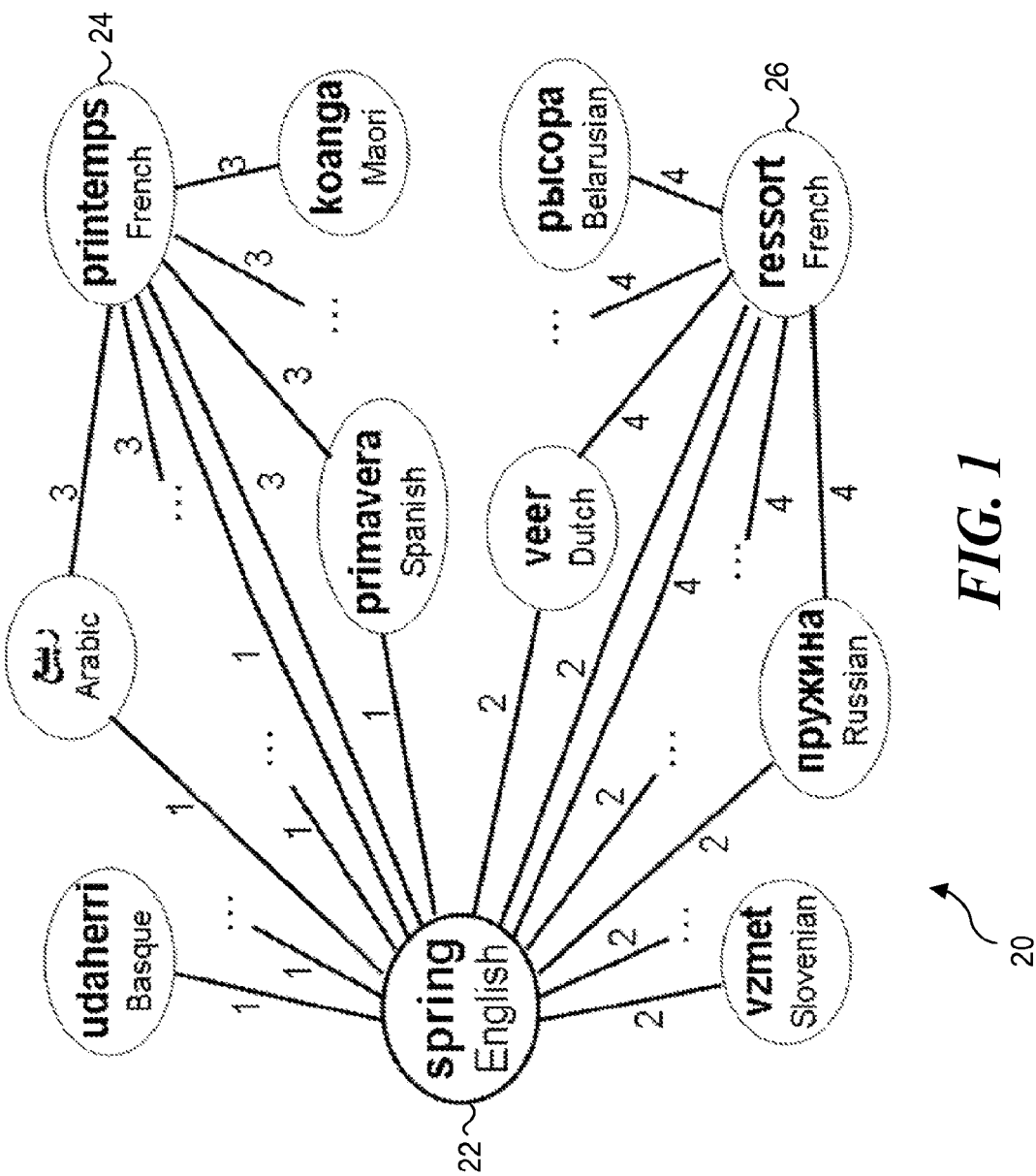
FIG. 1 illustrates an exemplary fragment of a translation graph for two wordsenses of the English word "spring" wherein two edges are for the wordsense meaning "a season" and two other edges are for the wordsense meaning a flexible coil—both of which are from an English dictionary that was merged with translation entries from a French dictionary.

A lexical translation graph is constructed from multiple dictionaries, and paths in the graph can be used to infer lexical translations that are not directly included in source dictionaries. Each node n in the graph is an ordered pair (w, l) where w is a word in a language l. An edge in the graph between $(w_1, l_1)$ and $(w_2, l_2)$ represents the belief that $w_2$ is a translation into $l_2$ of a particular sense of the word $w_1$. The edge is labeled by an integer denoting an ID for that wordsense. Paths through the graph represent correct translations so long as all of the edges on the path share a single wordsense. The term "sense" is used herein to indicate each different type of meaning of a word. Many languages include words that have very different meanings. The example shown in FIG. 1 provides a clear illustration of this problem, in regard to the English word "spring," which can be a season of the year, a verb meaning "to leap," or a component that exerts a biasing force, such as a flexible spring. It is important to understand that the lexical translation graph can identify translations that are absent from any of its source dictionaries, based upon inferences that are derived from the relationships between words of different languages having the same sense, as provided by different dictionaries used in creating the translation graph.

FIG. 1 shows portion 20 of a lexical translation graph for two senses of "spring" in English, as indicated by an entry 22. This portion of the lexical translation graph also shows two corresponding French words "printemps" (the season spring)

at an entry 24, and "ressort" (flexible spring) at an entry 26. The system automatically builds the lexical translation graph incrementally on the basis of entries from multiple, independent dictionaries, as described in detail below. As edges are added based on the entries from a new dictionary, it will be evident that some of the new wordsense IDs are redundant, because they are equivalent to wordsenses already in the graph that were provided by another dictionary. For example, the system automatically assigns one wordsense ID to the seasonal sense of "spring," from an English dictionary, a new wordsense ID to the French dictionary entry for "printemps," and so forth (see labels "1" and "3" in FIG. 1). This phenomenon is referred to herein as "sense inflation."

Sense inflation would severely limit the utility of the lexical translation graph, so a mechanism is included in the system for identifying duplicate wordsenses automatically. The system automatically computes the probability $\text{prob}(s_i=s_j)$ that a pair of distinct IDs $s_i$ and $s_j$ refer to the same wordsense. Thus, the system determines that wordsense ID "3" on edges from "printemps" has a high probability of being equivalent to sense ID "1."

The system automatically builds the lexical translation graph from online dictionaries and Wiktionaries of two kinds, including bilingual dictionaries that translate words from one language to another, and multilingual dictionaries that translate words in a source language to multiple target languages. Some dictionaries provide separate translations for each distinct wordsense, which is particularly helpful in creating the lexical translation graph, but others do not.

As the system automatically adds information to the graph from each new entry in a dictionary, it assigns a new, unique wordsense ID for each wordsense in that entry. Thus, in the example of FIG. 1, edges for translations of the season "spring" from the English dictionary have one wordsense ID, edges for translations of the flexible coil "spring" have a different wordsense ID, and so forth. When the translation in the entry is not wordsense distinguished, the system automatically makes the conservative assumption that each translation is in a distinct wordsense. The procedure used to recover from wordsense inflation caused by this assumption and from integrating information from multiple dictionaries to create the lexical translation graph is discussed below.

The lexical translation graph is implemented in this exemplary embodiment as a relational database, but is not intended to be limited to that type of structure, since other data configurations could be used instead. Each row in the lexical translation table represents an edge in the graph, while each row in a corresponding wordsense equivalence table is associated with the probability, $\text{prob}(s_i=s_j)$, that two wordsense IDs $s_i$ and $s_j$ are equivalent.

Addressing the Effects of WordSense Inflation

As pointed out above, accumulating entries from multiple dictionaries results in sense inflation. The following discussion explains how this problem is addressed by computing wordsense equivalence probabilities of the form $\text{prob}(s_i=s_j)$.

Figure 2:
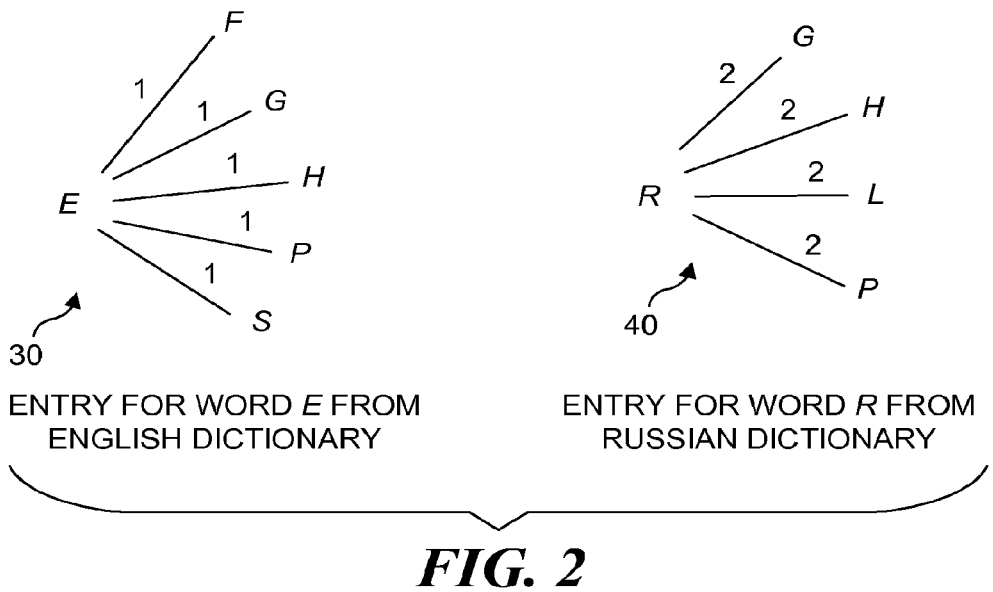
FIG. 2 is an exemplary schematic diagram showing edges from an entry for the word E from an English dictionary and edges from an entry for the word R from a Russian dictionary.
Figure 3:
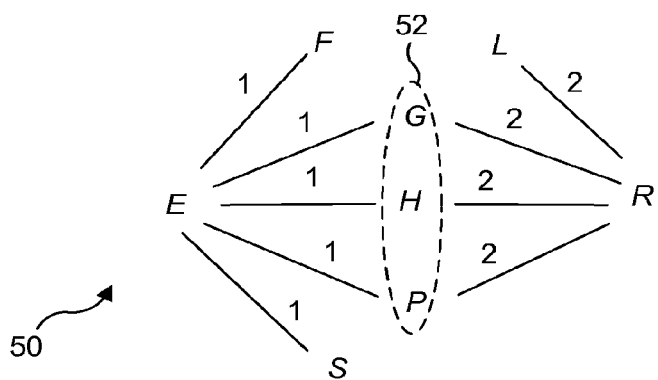
FIG. 3 illustrates the entries from FIG. 2 that have both been added to the graph, showing how the set of nodes with wordsense ID 1 overlaps with the set of nodes for wordsense ID 2, wherein the proportion of overlapping nodes gives evidence that the two wordsenses may be equivalent.

FIGS. 2 and 3 schematically illustrate how the present system accumulates entries from multiple dictionaries. FIG. 2 shows graph edges 30 from an entry for a word (represented by "E") from an English dictionary that gives translations into French, German, Hungarian, Polish, and Spanish (respectively represented by "F," "G," "H," "P," and "S"). The system that creates the lexical translation graph assigns the wordsense ID 1 for these edges. This Figure also shows edges 40 from an entry for a word (represented by "R") from a Russian dictionary, which in this case has translations into German, Hungarian, Latvian, and Polish (respectively represented by "G," "H," "L," and "P"). These edges are assigned wordsense ID 2.

FIG. 3 shows a result 50 after both sets of edges 30 and 40 have been added to the lexical translation graph. There are six nodes with edges labeled with wordsense ID 1, {E, F, G, H, P, S}; five nodes with edges labeled 2, {G, H, L, P, R}; and an inter-section 52 of these sets comprising three nodes, {G, H, P}. The three nodes in the intersection have two incident edges with distinct sense IDs 1 and 2. The proportion of intersecting nodes provides evidence that these IDs refer to the same wordsense.

The system automatically determines the probability that two wordsense IDs $s_i$ and $s_j$ are equivalent as follows:

A wordsense is equivalent to itself: $\text{prob}(s=s)=1$.

If $s_i$ and $s_j$ are alternate wordsenses from the same entry in a sense-distinguished dictionary, then they are assumed to be distinct: $\text{prob}(s_i=s_j)=0$.

If wordsenses $s_i$ and $s_j$ have at least k intersecting nodes, then set the probability by Eq. (1) below.

In all other cases, the probability is undefined.

TRANSGRAPH estimates the probability that $s_i$ and $s_j$ are equivalent wordsenses based the following equation:

If $|\text{nodes}(s_i) \cap \text{nodes}(s_j)| \geq k$, then:

$$\text{prob}(s_i = s_j) = \max\left(\frac{|\text{nodes}(s_i) \cap \text{nodes}(s_j)|}{|\text{nodes}(s_i)|}, \frac{|\text{nodes}(s_i) \cap \text{nodes}(s_j)|}{|\text{nodes}(s_j)|}\right) \quad (1)$$

where nodes(s) is the set of nodes that have edges labeled by wordsense ID s, and k is a sense intersection threshold.

As an example of computing the probability of wordsense equivalence, an early exemplary embodiment of the lexical translation graph had 56 translations for the season sense of "spring" from an English dictionary, and 12 translations for "printemps" from a French dictionary. Eight of these translations overlap, giving a probability of $8/12=0.67$ that the two senses are equivalent.

Computing Translation Probabilities

Given the lexical translation graph coupled with the wordsense equivalence probabilities, the system can automatically compute the probability that a particular word is a translation of another word in a given wordsense. The following discussion explains how an exemplary embodiment of this approach computes the probability of a single translation path and how evidence can be combined across multiple paths.

Consider a single path P that connects node $n_l$ to node $n_k$, where $n_i$ is the word $w_i$ in language $l_i$ and the ith edge has wordsense $s_i$. Let $\text{pathProb}(n_l, n_k, s, P)$ be the probability that $(w_1, l_1)$ is a correct translation of $(w_k, l_k)$ in wordsense s, given a path P connecting these nodes.

The simple case is where the path is of length 1. If s is the same sense ID as $s_1$, then the probability is simply 1.0; otherwise, it is the probability that the two senses are equivalent:

$$\text{pathProb}(n_l, n_k, s, P) = \text{prob}(s=s_1) \quad (2)$$

Where the path P has more than one edge, the path probability is reduced by $\text{prob}(s_i=s_i+1)$ whenever the wordsense ID changes along the path. The simplifying assumption is made that sense-equivalence probabilities are mutually independent. Formally, this assumption gives the term:

$$\Pi_{i=1 \ldots |P|-1} \text{prob}(s_i=s_{i+1})$$

If the desired sense s is not found on the path, it is also necessary to factor in the probability that s is equivalent to at least one sense $s_i$ on the path, which is approximated by the maximum of $prob(s=s_i)$ over all $s_i$. Formally, this expression gives the term:

$$\max_{i=1\ldots|P|}(prob(s=s_i))$$

which is equal to 1.0 if s is found on path P.

Putting these two terms together produces the following formula for simple paths of length ($|P|>1$):

$$pathProb(n_1, n_k, s, P) = \max_{i=1\ldots|P|}(prob(s=s_i)) \times \prod_{i=1\ldots|P|-1} prob(s_i = s_{i+1}) \quad (3)$$

Note that paths containing non-consecutive repetition of sense IDs (e.g., 1, 2, 1) are disallowed.

There are typically multiple paths from one node to another in the lexical translation graph. The simplest way to compute $prob(n_j, n_k, s)$ is to take the maximum probability of any path between $n_j$ and $n_k$.

$$prob(n_1, n_k, s) = \max_{P \in paths}(pathProb(n_1, n_k, s, P)) \quad (4)$$

Another exemplary method gives higher probability if there are multiple distinct paths between words. In this alternative approach, two paths from $n_1$ to $n_k$ are defined to be distinct if there is a distinct sequence of unique wordsense IDs on each path.

The standard "Noisy-Or" model is used to combine evidence. The basic intuition is that translation is correct unless every one of the translation paths fails to maintain the desired sense s. The probability of failure is multiplied for each path and is then subtracted from one to obtain the probability of correct translation. The probability that $n_j$ is a correct translation of $n_k$ in wordsense s is:

$$prob(n_1, n_k, s) = 1 - \prod_{P \in distinctP}(1 - pathProb(n_1, n_k, s, P)) \quad (5)$$

where distinctP is the set of distinct paths from $n_j$ to $n_k$.

It was found that a current implementation of the Noisy-Or model tends to give inflated probability estimates, so the maximum path probability was used in the experiments reported herein. Defining distinct paths as those with distinct sense IDs is not sufficient to ensure that paths are based on independent evidence. It is possible that better methods can be developed for determining independent paths, and more sophisticated probability models to combine evidence.

Confidence in Dictionary Entries

The exemplary methods used for computing translation probabilities have, thus far, made a strong assumption. It has been assumed that each wordsense ID comes from a sense-distinguished dictionary entry, which means that nodes($s_i$), the set of nodes with edges to sense $s_i$, are mutual translations of each other in the same sense.

It has been determined that many of the errors in computing pathProb($n_j$, $n_k$, s, P) are from cases where this assumption is violated by some wordsense ID along the path. If all words in the set nodes($s_i$) do not share the same wordsense, any path that passes through wordsense $s_i$ may result in translation errors.

These "impure" wordsense IDs may arise either from errors in a dictionary or from errors parsing the dictionary. As an example, the French Wiktionary has an entry for the word "boule" with English translations as "ball," "boule," "bowl," "chunk," "clod," and "lump." These are all good translations of "boule," but clearly not all in the same sense. An example of a parsing error is the truncation of translation phrases in some dictionary entries, causing bizarre translations.

To compensate for these impure sense IDs, experiments have developed methods to compute $prob(s_i)$, the probability that all words in nodes($s_i$) share a common wordsense. This method adds the term $prob(s_1)$ to Eq. (2) and Eq. (3), and adjusts Eq. (3) to include $prob(s_i+1)$ for each new sense $s_{i+1}$ along the path.

The a priori probability for $prob(s_1)$ is set according to a global confidence in the dictionary. If the dictionary has a high ratio of wordsenses per entry, the assumption is that the dictionary entries distinguish wordsenses, and the default $prob(s_1)$ is set to 1.0.

The existence of multiple, possibly non-synonymous translations into the same language lowers the confidence level that a dictionary entry is pure. While it is possible to find evidence that two words are synonyms, determining that they are non-synonymous is more difficult. It has been found that even English WordNet is not a strong source of evidence for non-synonymy. Of the cases where nodes($s_i$) includes two English translations that are not WordNet synonyms, they were actually synonymous about half the time. Preliminary experiments indicate that even crude estimation of $prob(s_1)$ can improve the precision of translation graph traversal. The results discussed below include a early attempt to estimate $prob(s_1)$.

Bilingual Dictionaries

The method for computing word-sense equivalence discussed above relies on having multiple translations for each wordsense. Unfortunately, that luxury does not always exist. In response, cliques in the graph have been identified as an additional structure that helps to combat sense inflation.

Figure 4:
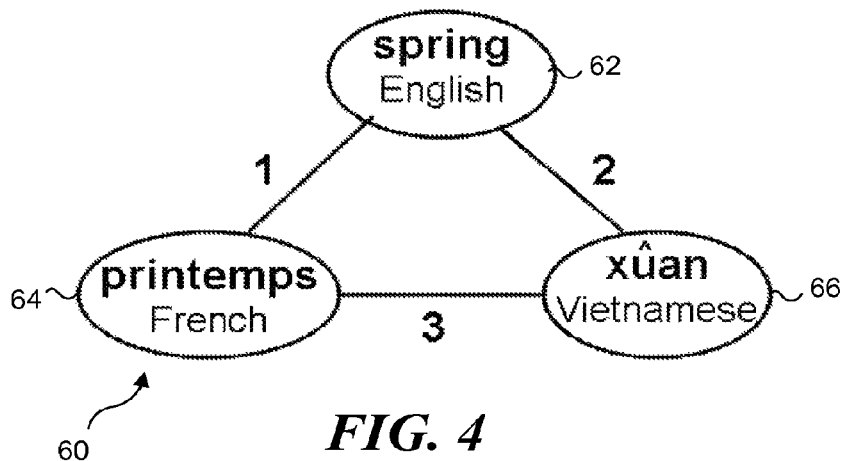
FIG. 4 illustrates an example showing how the translation graph infers that wordsenses are equivalent with high probability when nodes form a 3-node clique in the graph; in this example, the Vietnamese word "xuân" is translated to the English word "spring" and the French word "printemps" in the wordsense meaning a season.

Consider, for example, the simple clique shown in FIG. 4. The Figure shows a 3-node clique 60 where each of the edges was derived from a distinct dictionary, and hence has a distinct wordsense ID (1, 2, 3). The edge from (spring, English) 62 to (printemps, French) 64 is labeled "1" and comes from an entry for the season of spring from the English Wiktionary. The edge "2" from (xuân, Vietnamese) 66 to (spring, English) 62 is from a Vietnamese-English dictionary that does not specify which sense of spring is intended. The edge "3" from (xuân, Vietnamese) to (printemps, French) is from a Vietnamese-French dictionary, again without any indication of wordsense.

It has long been known that this kind of triangulation gives a high probability that all three words share a common wordsense. The probability that all three wordsense IDs of a 3-node clique are equivalent is empirically estimated to be approximately 0.80 in the current exemplary translation graph. The TRANSGRAPH compiler finds all cliques in the graph of size 3 where two wordsenses are from bilingual dictionaries and then adds an entry to the wordsense equivalence table with a probability 0.80 for each pair of sense IDs in the clique. It is possible that longer cliques and evidence from other elements of graph structure can be beneficially employed in this process.

Image Search with PAN IMAGES

The following discussion explains how the translation graph can be applied to cross-lingual image searches. The Web has emerged as a rich source of images that serve a wide range of purposes from children adorning their homework with pictures to anthropologists studying cultural nuances. Most people find images on the Web by querying an image search engine, such as that provided by Google™ Google™ collects images as part of its crawl of the Web and tags them with the words that appear in their vicinity on the crawled HTML documents and links. It is not surprising that most of the tags are in "major" languages such as English. So while images are universal, most of them can be found through Google™ only if you can query in the "right" language.

More broadly, monolingual image search engines face the following challenges:

Limited Resource Languages—The lower the Web presence of a language, the fewer hits a speaker of that language gets from a query. A query for "grenivka" (Slovenian for "grapefruit") produces only 24 results, of which only 9 are images of grapefruits. Yet translating the query into English produces tens of thousands of images with high precision.

Cross-Cultural Images—Results of an image search may vary considerably depending on the language of the query term. Translating the query "baby" or "food" into Chinese, Arabic, or Zulu allows an interesting cultural comparison.

Cross-Lingual Masking—A word in one language is often a homonym for an unrelated word in another language. Relevant results can be swamped by results for the unrelated word. The Hungarian word for tooth happens to be "fog;" the only way to get images of teeth rather than misty weather is to query with a translation that doesn't suffer from cross-lingual masking.

Wordsense Ambiguity—Searching for an image that corresponds to a minor sense of a word is problematic. Most results for the query "spring" are images of flowers and trees in bloom. If a user wants images of flexible coils or of bubbling fountains, the most effective queries are translations of this sense of "spring" into languages where that word is not ambiguous.

FIG. 5 illustrates an exemplary system architecture 70 for the present novel approach. A PAN IMAGES compiler 72, a cross-lingual image-search application deployed on the Web, accesses a plurality of source dictionaries 74 to create a translation graph 76 that enables a monolingual user 78 to input a word in a language selected from any of the input languages available (currently about 50), automatically look up wordsense specific translations in more than 100 languages, and enables the user to control the returned translations that are input to an image search engine 82. At compile time, PAN IMAGES merges information from multiple Wiktionaries and open-source dictionaries 74 into translation graph 76, as described above. At run time, PAN IMAGES accepts a query from a user in processor 80, presents the user with possible translations found in the translation graph, then sends the translations selected by the user to the image search engine, as described below. The search engine conducts the search looking for images that have key words or tags corresponding to the translations selected by the user and returns the images to the user for selective display.

Use of Technology for Displaying or Presenting Ads to a User

Another application of this technology is likely to have considerable commercial value. Currently, it is common practice to display one or more ads to a user in response to detecting one or more keywords entered by a user, for example, in a query entered to search the Internet, or in an email or other document being composed online The ads are associated with specific keywords, typically in English. However, if the user is composing a search query to search the Internet or other data resource in a different language than that of the keyword associated with each ad, no ads will be displayed to the user, even if the word or phrase entered by a user in the different language has the same wordsense as the keyword associated with a specific ad. However, using the present approach, the translation graph produced using the present technology can be employed by a search engine (or other software entity) to identify keywords in any language associated with ads that correspond in wordsense to the word or words entered by a user in a search query or other online input. Thus, the entry in Chinese by a user of the word having the wordsense corresponding to the English word "bouquet" might cause an ad for an online florist to be displayed, even though the keyword associated with ad is the English word "bouquet." Any word in any language that is included in the translation graph, which is entered by a user can then cause the search engine to identify an ad associated with a word having a corresponding wordsense in any language to be displayed or otherwise presented to the user. This approach can thereby greatly increase the frequency with which ads are displayed to users, and since the revenue generated by display ads to users depends on the frequency with which the ad is displayed, it will be evident that the present technology can greatly enhance that revenue stream.

Interface Design

Finding Translations: PAN IMAGES looks up the node $(w_i, l_i)$ in the translation graph that corresponds to the query word and language input by the user, then follows edges in the graph to create one or more sets of nodes $(w_j, l_j)$ where $w_j$ is a translation into the language $l_j$ for a particular wordsense of $w_i$. For each wordsense, PAN IMAGES follows paths of length up to k in which the probability that the wordsense has not changed according to Equation 4 is above a threshold $\tau$. In experiments relating to this issue, k was set to 3 and $\tau$ was set to 0.2, but these values are simply exemplary and are not intended to be in any way limiting on the scope of this approach.

In the example in FIG. 1 for the English word "spring," translations in sense 1 include nodes reachable from sense 1 and nodes reachable from (printemps, French) along edges for sense 3. Beginning from "spring" with sense 3 and continuing on paths for sense 1 or 3 produces an identical set of translations that TRANSGRAPH later merges with translations for sense 1.

Presenting Translations to the User: PAN IMAGES presents these sets of translations and allows the user to select one or more translations to be sent to Google™ Images. As a practical consideration, PAN IMAGES defaults to selecting translations in a language with high Web presence: an English translation for all source languages but English, and a French translation for English queries. The user may add or remove any of the translation-language pairs to the query before clicking on Show Images. Another option is to click on a single translation to immediately send that translation as a query to the image search engine.

Handling Wordsenses: PAN IMAGES lists each distinct wordsense along with a gloss if available and the number of translations for this wordsense. The user can click on a wordsense to see the list of translations for that sense. PAN IMAGES presents the wordsense with the largest number of translations first, and selects this as the default wordsense.

Experimental Results

The following discussion presents statistics on an exemplary current, automatically constructed translation graph; reports on an evaluation of translation inferences over the graph; and reports on recall and precision results from a sample of image search queries over this translation graph.

Graph Statistics:

The translation graph is composed of 1,267,460 words in more than 100 languages. Three of the languages have over 100,000 words and 58 of the languages have at least 1,000 words. The words were extracted from 3 multilingual dictionaries (English and French Wiktionaries, and an Esperanto dictionary) and 14 bilingual dictionaries, giving a total of 2,315,783 direct translations or edges in the graph. Further translations can be found from graph paths with length greater than one edge.

Building a translation graph from a combination of these dictionaries provides more translations than any of these dictionaries alone. The English Wiktionary had translations for 19,500 words—after adding the other dictionaries, the graph has translations for over 255,000 English words and phrases, the bulk of them from bilingual dictionaries. Similarly, coverage of French went from 12,700 words in the French Wiktionary to 32,800 in the graph.

Evaluating Inferred Translations

The precision and recall gain from inference was evaluated using Eqs. (1) through (4) as follows. For a random set of 1,000 English words, Hebrew or Russian translations were found using the translation graph. Also, a random set of 1,000 Turkish words were used with the translation graph to find Russian translations. The set of random words was not weighted by word frequency. Thus they contained many relatively obscure words (e.g., abashment, abjectly, Acrididae, "add up") for which no translation was found in the target language.

The baseline is the number of words in the source language that can be translated using only direct edges in the graph. Inferred translations that can be made from a single application of the wordsense equivalence equation, i.e., Eq. (1), were then added with k set to 2 at a probability threshold of 0.2. Finally, all inferred translations were found using Eqs. (1)-4 and using graph paths from all 17 source dictionaries with path lengths up to 3 wordsense IDs at a probability threshold of 0.2.

FIGS. 6 through 8 compare the number of words translated and the proportion of correct translations. The total height of each bar represents the number of source language words that have at least one translation. Precision was measured as the number of correct translation pairs divided by the number of translation pairs that the system outputs. Note that precision is computed over all translations for a given word, some of which may be correct and others of which may be erroneous.

Like Russian, there are no bilingual dictionaries for Hebrew and no Hebrew multilingual dictionary. Inference based on Eq. (1) boosts translated words by 43%, and using all translation paths gives a gain of 80% over the baseline. The baseline precision drops from 93% to 79%.

Translations from Turkish to Russian showed a large gain from inferences based on bilingual dictionaries. While direct edges came only from the three multilingual dictionaries, there were also three bilingual dictionaries between Turkish and English, German, or Kurdish. In turn, these dictionaries interacted with other bilingual dictionaries for English, German, and Kurdish. Inference from all paths resulted in a three-fold increase in translated words, while maintaining high precision (80%).

In summary, applying inference over the translation graph yields a tradeoff between translation coverage and precision. The tradeoff can be controlled using the probability threshold—lowering the threshold increases coverage, but reduces precision. In the Web image retrieval context, where precision is already far from perfect, the tradeoff seems like a good one, particularly for the numerous "minor" languages, where few images are returned in response to many queries. Finally, it is expected that as dictionaries are added to the translation graph and as Wiktionaries grow in size, both coverage and precision will increase in tandem.

Image Retrieval Performance

Also evaluated were the coverage and precision of PAN IMAGES image searches for non-English queries wherein the results of sending the non-English query directly to a conventional Google Image search were compared with the results of sending the default PAN IMAGES translation instead. A limited test set of languages and words were selected to limit the manual tagging effort necessary for this experiment.

To generate a test set of words, 10 arbitrary concepts that are associated with distinctive images were selected, including six nouns (ant, clown, fig, lake, sky, train), two verbs (eat, run), and two adjectives (happy, tired). Next, 32 languages with a limited Web presence, ranging from Danish and Dutch to Telugu and Lithuanian, were selected. For each concept, ¼ of the languages were chosen at random, and the word for the concept was recorded in the language. These 80 words became a set of non-English queries. The precision and recall of the Google™ image search were then compared for these 80 words "as is," with the precision and recall of the Google™ image search for the words translated by PAN IMAGES into English.

As shown in FIG. 9, a PAN IMAGES translation 102 resulted in a 75% gain over an un-translated query result 104, from an average of 49.6 correct results, to an average of 86.8. Average precision also rose 27% from 0.25 to 0.32. The main cause of low precision for the minor language queries was cross-lingual masking. The query term was a homonym of a completely unrelated word in a major language.

Translating the queries from minor languages into a major language gives a large boost in recall. The average number of results as estimated by Google™ was 33,000 for minor language queries, and 1,856,000 for the queries translated by PAN IMAGES, a 57-fold increase. For 10% of the minor language queries Google™ failed to return any images.

Exemplary Logic for Creating a Translation Graph

FIG. 10 illustrates a flowchart 110 showing exemplary logical steps for creating a translation graph in accord with the present novel approach. Upon starting, a step 112 creates a plurality of empty database tables, which in this embodiment, include a Language table having one row for each different language name (and its ISO code), a WordSenses table having a row for each dictionary entry that is found, a WordNodes table having a row for each new word found in one of the plurality of source dictionaries, a Translation table having a row for each appearance of a word in a dictionary entry, i.e., a wordnode-wordsense pair, and a SenseEquivalence table having a row for each pair of wordsenses that forms part of a triangle and a row for each pair of multilingual wordsenses that overlap by two or more words. A step 114 populates the Language table with the language names and their corresponding ISO codes. In parallel with steps 112 and 114, a step 116 parses the plurality of source bilingual and multilingual dictionaries, which are typically accessed over the Internet, into extended markup language (XML) format. Following both steps 114 and 116, a step 118 uses the results to populate the tables of the database from the XML files produced by parsing the plurality of dictionaries. It will be understood that in this embodiment, the database of tables is the structure used for the translation graph; however, further steps must be carried out to make the database tables (i.e., the translation graph) more useful, infer more translations, and increase the accuracy of the translation graph.

The WordSenses table includes a probability for each wordsense entry. A step 120 provides for decreasing this initial probability for each dictionary entry that contains a number of translations into the same language that is greater than a predefined threshold number, e.g., three. A step 122 also inserts one row into the SenseEquivalence table for each pair of multilingual wordsenses that overlap by two or more words. Bilingual dictionary entries are removed from the database if they are subsumed by a multilingual dictionary entry, in a step 124. In a step 126, the method queries the database to identify all triangles (like the example shown in FIG. 4), since this step enables a row to be inserted into the SenseEquivalence table for each pair of wordsenses that forms part of such a triangle, as indicated in a step 128. Also, an additional translation comprising one edge can be inferred from two translations obtained from the plurality of source dictionaries, which increases the total translations available in the translation graph. The resulting translation graph can then be employed for carrying out searches, as discussed below.

Exemplary Logic for Traversing the Translation Graph

FIG. 11 illustrates a flowchart 130 that includes exemplary logical steps for traversing a translation graph (e.g., as created above) to obtain translations of an input word in a language, in order to search a collection of data. For example, a user can search for images or other types of objects, entities, or resources that are accessed via tags or keywords. The content of the Internet is indexed by crawling the Web, e.g., to create an index that can then be searched by a search engine such as Google™. The translation graph is particularly useful in searching for images, because images are universally appreciated and understood, without any knowledge of a language. Searching for images using keywords in a number of different languages corresponding in wordsense to a word in a language input by a user has been shown to return many more images than a search carried out using only the single input word and language.

After starting, a step 132 enables a user to input a word (or phrase) and a language for use in a query. This query of the translation graph is employed in a step 134 to identify wordnodes corresponding in wordsense to the word and language input by the user. A step 136 creates a plurality of sense clusters, each sense cluster being produced by combining all wordnodes contained in each wordsense reachable by a path length that is less than or equal to a predefined maximum (e.g., less than or equal to a path length of 2). A step 138 then determines the probability of each wordnode in each sense cluster. In this step, the probability is determined for each path that ends at the wordnode by multiplying together the probabilities associated with each wordnode and each edge in the path. For each wordnode, the probability is based on the information included in the WordSense table, while for each edge, the probability is based on the information in the SenseEquivalence table. All wordnodes are removed from each sense cluster that have a probability less than a predefined threshold in a step 140. A step 142 merges sense clusters based on their size and the number of wordnodes that they have in common.

A user is then enabled to select from the wordnodes having the wordsense corresponding to the word input that are returned, for use in requesting the search engine to search for desired objects, entities, or resources that are available in a data collection, in a step 144. A step 146 then displays the results returned by the search engine to the user.

Exemplary Computing System for Implementing Novel Approach

FIG. 12 illustrates details of a functional block diagram for an exemplary computing device 200, which can be employed for a user computing device to implement a search on a network, such as the Internet, or can comprise a server that stores (or accesses) data to be searched, or a server that includes the translation graph that is accessed to determine wordnodes having a corresponding wordsense to a word in a language input by a user. The computing device can be a typical personal computer, but can take other forms. For example, user computing devices can be implemented as smart phones, personal data assistants, gaming machines, and many other types of network-connected logical devices that are employed for searching and accessing information on a network or on the Internet.

A processor 212 is employed in the exemplary computing device for executing machine instructions that are stored in a memory 216. The machine instructions may be transferred to memory 216 from a data store 218 over a generally conventional bus 214, or may be provided on some other form of memory media, such as a digital versatile disk (DVD), a compact disk read-only memory (CD-ROM), or other non-volatile memory device. An example of such a memory medium is illustrated by a CD-ROM 234. Processor 212, memory 216, and data store 218, which may be one or more hard drive disks or other non-volatile memory, are all connected in communication with each other via bus 214. The machine instructions are readable by the processor and executed by it to carry out the functions discussed above in regard to the exemplary embodiments. Also connected to the bus are a network interface 228 which couples to the Internet or other network 230, an input/output interface 220 (which may include one or more data ports such as a serial port, a universal serial bus (USB) port, a Firewire (IEEE 1394) port, a parallel port, a personal system/2 (PS/2) port, etc.), and a display interface or adaptor 222. Any one or more of a number of different input devices 224 such as a keyboard, mouse or other pointing device, trackball, touch screen input, etc., are connected to I/O interface 220. A monitor or other display device 226 is coupled to display interface 222, so that a user can view graphics and text produced by the computing system as a result of executing the machine instructions, both in regard to an operating system and any applications being executed by the computing system, enabling a user to interact with the system. An optical drive 232 is included for reading (and optionally writing to) CD-ROM 234, a DVD, or some other form of optical memory medium.

Although the concepts disclosed herein have been described in connection with the preferred form of practicing them and modifications thereto, those of ordinary skill in the art will understand that many other modifications can be made thereto within the scope of the claims that follow. Accordingly, it is not intended that the scope of these concepts in any way be limited by the above description, but instead be determined entirely by reference to the claims that follow.

The embodiments of the invention in which an exclusive property or privilege is claimed are defined as follows:

1. A method for using a translation graph to search for objects, entities, or resources related to an input word input by a user in a given language,
  wherein the translation graph is usable to find words in a plurality of languages different from the given language that have wordsense meanings corresponding to wordsense meanings of the input word, and wherein the translation graph includes:
    a plurality of wordnodes; and
    a plurality of edges;

wherein each wordnode is associated with a word, a language, and one or more wordsenses; and wherein each edge connects tow wordnodes and is associated with a wordsense with which the two connected wordnodes are the both associated;

the method comprising:

searching the translation graph for candidate wordnodes, wherein each candidate wordnode is associated with a language different from the given language and is connected to a wordnode of the input word via a path comprising one or more edges of the translation graph;

for one or more of the candidate wordnodes, determining a probability that the candidate wordnode is associated with a wordsense corresponding to a wordsense associated with the wordnode of the input word;

returning a set of result wordnodes that is determined based on a comparison of the determined probabilities of the one or more candidate wordnodes to a predetermined threshold;

supplying the result wordnodes for creating a query of a search engine; and using the query, employing the search engine to search a collection of data to identify objects, entities, or resources included in the data that are relevant to a wordsense meaning of the input word, the search engine searching for tags assigned to objects, entities, or resources that include at least one word of the result wordnodes.

2. The method of claim 1, further comprising building a wordsense cluster for each wordsense associated with at least one candidate wordnode by combining all of the candidate wordnodes associated with each such wordsense that can be reached by a path starting at the wordnode of the input word and comprising no greater than a predefined maximum number of edges of the translation graph.

3. The method of claim 2, further comprising removing wordnodes in each wordsense cluster that have a probability less than a predetermined threshold value.

4. The method of claim 2, further comprising merging together wordsense clusters based upon a size of the wordsense clusters and upon a number of wordnodes that the wordsense clusters have in common.

5. The method of claim 1, wherein determining the probability that the candidate wordnode is associated with a wordsense corresponding to a wordsense associated with the wordnode of the input word comprises:

determining a path probability for each path in the translation graph that ends at a candidate wordnode by multiplying together probabilities associated with each wordnode of the path; and using either maximum of the path probabilities or a noisy-or calculation to determine the probability that the candidate wordnode is associated with a wordsense corresponding to a wordsense associated with the wordnode of the input word.

6. The method of claim 1, wherein employing the search engine includes:

using the search engine to search for relevant images based upon keyword tags associated with the images that are in languages which are different from the given language.

7. The method of claim 1, wherein the collection of data comprises an indexed database of the Internet, and wherein employing the search engine includes searching the indexed database of the Internet to identify objects, entities, or resources relevant to the input word based upon the result wordnodes.

8. The method of claim 1, wherein employing the search engine includes:

using the search engine to search for one or more ads associated with a keyword, wherein the keyword has been identified as having a common wordsense with the input word, and wherein the keyword is associated with a language other than the given language.

9. A system for using a translation graph to search for objects; entities, or resources related to an input word input by a user in a given language, wherein the translation graph is usable to find words in a plurality of languages different from the given language that have wordsense meanings corresponding to wordsense meanings of the input word wherein the translation graph includes:

a plurality of wordnodes; and a plurality of edges;

wherein each wordnode is associated with a word, a language, and one or more wordsenses; and wherein each edge connects two wordnodes and is associated with a wordsense with which the two connected wordnodes are both associated;

and wherein the system comprises:

a memory for storing data and machine instructions;

a user input device enabling a user to input text and control the system;

a display for displaying text and graphics; and a processor that is coupled to the memory, the user input device, and the display, the processor configured to execute the machine instructions stored in the memory to cause the system to carry out a plurality of functions, including:

searching the translation graph for candidate wordnodes, wherein each candidate wordnode is associated with a language different from the given language and is connected to a wordnode of the input word via a path comprising one or more edges of the translation graph;

for one or more of the candidate wordnodes determining a probability that the candidate wordnode has a wordsense corresponding to a wordsense of the wordnode of the input word;

returning a set of result wordnodes that is determined based on a comparison of the determined probabilities of the one or more candidate wordnodes to a predetermined threshold;

supplying the result wordnodes for creating a query of a search engine; and using the query, employing the search engine to search a collection of data to identify objects, entities, or resources included in the data that are relevant to a wordsense meaning of the input word, the search engine searching for tags assigned to objects, entities, or resources that include at least one word of the result wordnodes.

10. The system of claim 9, wherein the plurality of functions further include building a wordsense cluster for each wordsense associated with at least one candidate wordnode by combining all of the candidate wordnodes associated with each such wordsense that can be reached by a path starting at the wordnode of the input word and comprising no greater than a predefined maximum number of edges of the translation graph.

11. The system of claim 10, wherein the plurality of functions further include removal of wordnodes in each wordsense cluster that have a probability less than a predetermined threshold value.

12. The system of claim 10, wherein the plurality of functions further include merging together wordsense clusters based upon a size of the wordsense clusters and upon a number of wordnodes that the wordsense clusters have in common.

13. The system of claim 9, wherein determining the probability that the candidate wordnode has a wordsense corresponding to a wordsense of the wordnode of the input word comprises:
   determining a path probability for each path in the translation graph that ends at a candidate wordnode by multiplying together probabilities associated with each wordnode of the path; and
   using either a maximum of the path probabilities or a noisy-or calculation to determine the probability that the candidate wordnode has a wordsense corresponding to a wordsense of the wordnode of the input word.

14. The system of claim 9, wherein employing the search engine includes:
   using the search engine to search for relevant images based upon keyword tags associated with the images that are in languages which are different from the given language.

15. The system of claim 9, wherein employing the search engine includes:
   using the search engine to search for one or more ads associated with a keyword, wherein the keyword has been identified as having a common wordsense with the input word, and wherein the keyword is associated with a language other than the given language.

* * * * *

UNITED STATES PATENT AND TRADEMARK OFFICE
CERTIFICATE OF CORRECTION

| | | Page 1 of 1 |
|---|---|---|
| PATENT NO. | : 8,489,385 B2 | |
| APPLICATION NO. | : 13/532742 | |
| DATED | : July 16, 2013 | |
| INVENTOR(S) | : O. Etzioni et al. | |

It is certified that error appears in the above-identified patent and that said Letters Patent is hereby corrected as shown below:

In the Claims

| COLUMN | LINE | ERROR |
|---|---|---|
| 17 Claim 1 | 3 | "tow" should read --two-- |
| 17 Claim 1 | 5 | "are the both" should read --are both-- |
| 18 Claim 9 | 9 | "objects;" should read --objects,-- |

Signed and Sealed this
Fifteenth Day of July, 2014

Michelle K. Lee
*Deputy Director of the United States Patent and Trademark Office*